April 23, 1935.  C. E. REED  1,999,132
REAMER FOR EARTH BORING DRILLS
Filed March 5, 1934  2 Sheets-Sheet 1

Clarence E Reed INVENTOR

ATTORNEYS

April 23, 1935. C. E. REED 1,999,132
REAMER FOR EARTH BORING DRILLS
Filed March 5, 1934 2 Sheets-Sheet 2
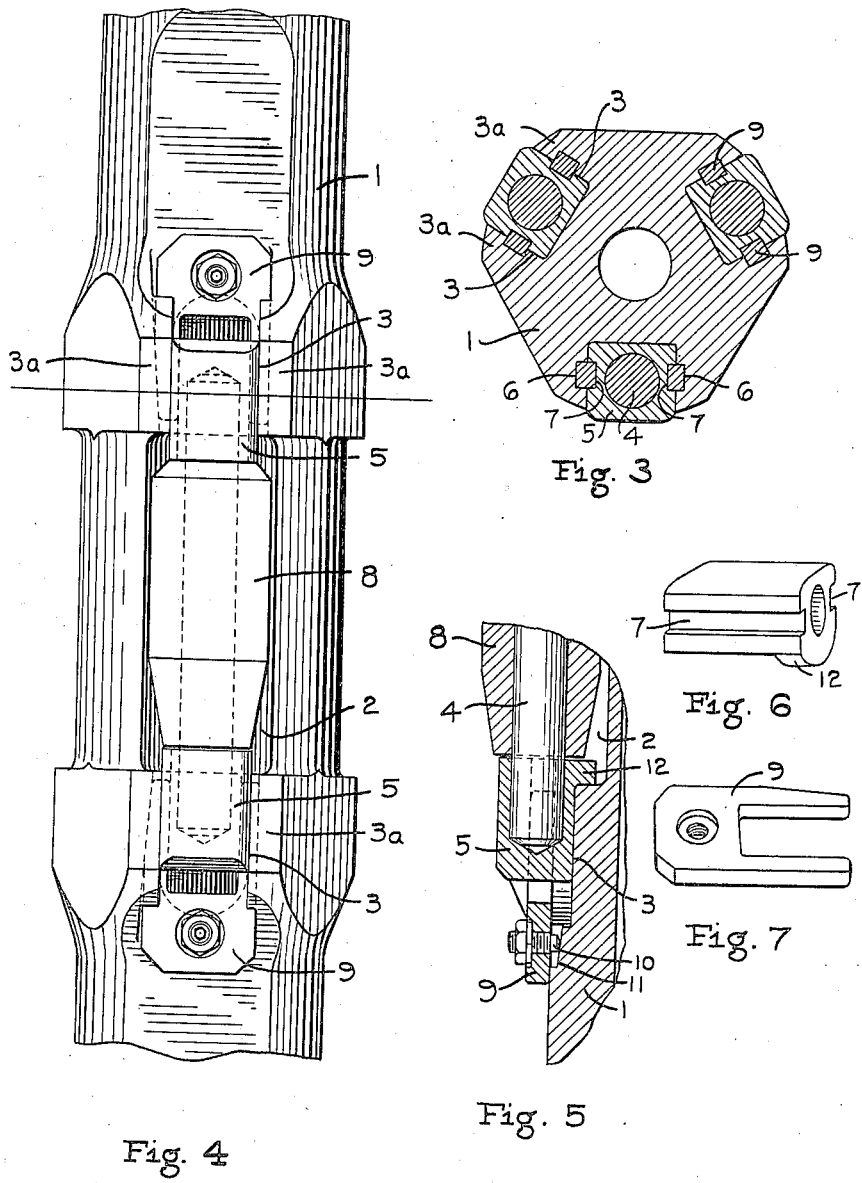

Patented Apr. 23, 1935

1,999,132

UNITED STATES PATENT OFFICE 1,999,132

REAMER FOR EARTH BORING DRILLS

Clarence E. Reed, Wichita, Kans.

Application March 5, 1934, Serial No. 714,155

19 Claims. (Cl. 255—73)

This invention relates to a reamer unit for use with earth boring apparatus, and is an improvement in the manner of mounting the cutters in the reamer head. It has been found that after more or less severe service, and partly from neglect in field assembly of the parts, that the bearing parts for the reamer may, under some conditions, have a slight movement on their seats, and the movement over a period of time increases the amount of the wear of normal service. As the wear of the seats of the bearings for the reamer roller cutter increases, the bearings have an increasing amount of movement, which movement has a destructive effect on the reamer body.

It is an object of this invention to rigidly lock the roller cutter bearing assembly to the reamer body and permanently hold the bearing assembly against any movement relative to the reamer body during operations of the apparatus in a well.

Other objects of the invention and novel features of the construction will be clear from the following description.

In the accompanying drawings:

Fig. 3 is a sectional view transversely through the body at the auxiliary recesses.

Fig. 4 is an elevation showing the cutter in outline, the bearing parts in dotted lines, the wedge "9" and the grooves.

Fig. 5 is a sectional view through the auxiliary recess, bearing block, wedge, locking means, and a portion of the cutter and bearing shaft.

Fig. 6 is a perspective view of the bearing block "5".

Fig. 7 is a perspective view of the wedge "9" without the associated lock means.

Figures 1, 2:
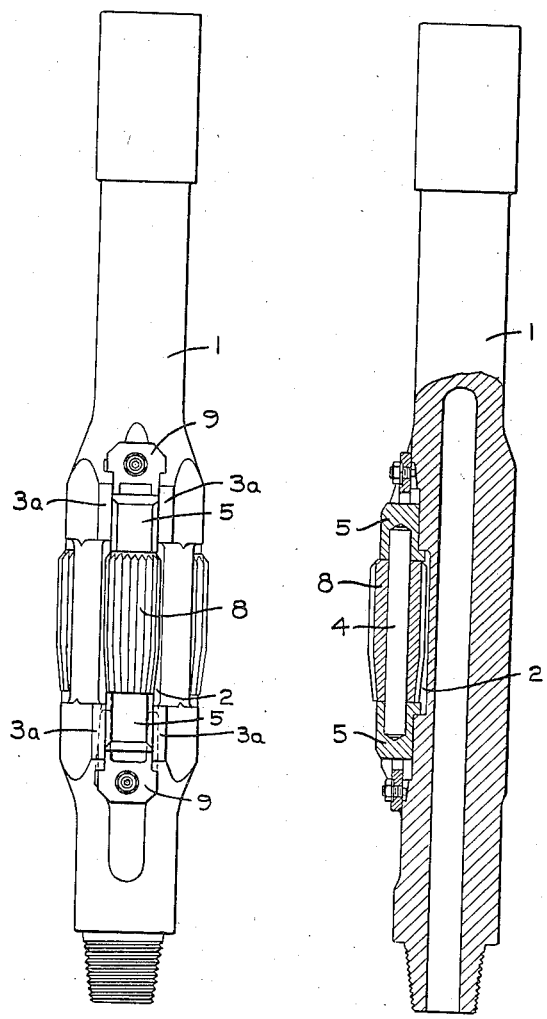
Figure 1 is an assembly view of the invention.
Fig. 2 is a sectional view through the reamer body and cutter and bearing assembly.

In these drawings 1 is the reamer body having a screw threaded box connection at the upper end and a screw threaded pin at the lower end for connections with a drill stem. It is provided with a central bore for the downflow of flushing fluid which carries away the cuttings from the bottom of the hole. Recesses 2 are provided in the side of the reamer body to receive the roller reamer cutters.

At the top and bottom of these recesses are auxiliary recesses 3, which auxiliary recesses open outwardly and are also open at each end. The roller cutter turns on a bearing shaft 4, each end of which is seated in a bearing block 5. One of these bearing blocks 5 may be made integral with the bearing shaft if desired. The auxiliary recesses are formed by lugs 3a projecting outwardly from the reamer body. The bearing blocks 5 are removably seated in the auxiliary recesses. In the auxiliary recess walls are grooves 6. In the sides of the bearing blocks 5 there are grooves 7. The grooves 6 and 7 register when the bearing blocks are seated in the auxiliary recesses. The reamer cutter 8 is assembled on the bearing shaft 4, the ends of which are placed in the bearing blocks 5, and the cutter, bearing shaft and bearing blocks as a unit are placed in position in the reamer body, with the cutter in recess 2 and the blocks in auxiliary recesses 3. Wedge keys 9 are then driven into registering grooves 6 and 7, from the open ends at the top and bottom of the assembly. These wedge keys 9 are made of relatively heavy, substantial steel parts and are driven up tight with a sledge. Sufficient clearance is allowed in the grooves so that the bearing blocks may seat on the body of the reamer and the wedges tighten the bearing blocks and hold them rigidly against any movement, but without the wedges taking inward thrusts radially of the reamer body. It will be observed that one leg of the wedge keys is tapered so as to drive the block away from contact with the side wall of the auxiliary recess in which this tapered leg is located, and to drive the block firmly against the opposite wall of the auxiliary recess. Dependence is had on the taper to hold the wedges in position, and experience has shown that the wedges do not loosen in operation. However, as a safety factor against the loss of the wedges, and the assembly in the well, in the event that for any reason the taper did not hold the wedge tight, a safety lock is provided in the nature of a set screw having a portion projecting inwardly, 10. A slot 11 is provided in the reamer body receiving the inwardly projecting portion 10 of the set screw, the end of the slot providing a stop, so that if the wedge came loose and moved outwardly the projecting portion 10 of the set screw carried by the wedge reaching the end of the slot 11 would prevent the wedge moving further outwardly, and thus the wedge could not move out of its position in the grooves.

It will be noted that the bearing blocks 5 are provided with a lip 12 which in assembled position in the reamer body shoulders on the reamer body at the end of the reamer cutter recess. End thrusts of the roller cutter are taken on the end face of the bearing block 5 and the lip 12 shouldering against the reamer body cooperates with the keys 9 in the grooves 6 and 7 to anchor the bearing block and assembled cutter and bearing unit rigidly to the reamer body at all times.

It will also be noted that the wedges 9 are formed in the shape of a U and when driven home there is a space in the bottom of the U open between the wedge and the outer end of the block 5, and when it is desired to change the reamer cutters for any reason a steel bar is used, one end of the bar being placed in this open space and the wedge may be readily pried or driven out of its position in the grooves. The set screw is, of course, first removed. After the wedge is removed the cutter, bearing shaft and bearing block assembly is lifted out. This construction has great strength of parts and assembly, safety, rigidity even when the reamer parts are worn out, and is very convenient to assemble or disassemble.

I claim:

1. In combination, a reamer body for earth boring drills having a main recess in its side, and an auxiliary recess of less depth than the main recess and non-circular in cross section, a bearing block non-circular in cross section in said auxiliary recess and conforming substantially to the cross sectional shape of said auxiliary recess, means for locking the bearing block in place against lateral outward movement from said auxiliary recess, a reamer shaft mounted in the bearing block, and a reamer cutter mounted on said shaft and lying in the main recess, the bearing block having a groove extending substantially vertically in its side, and the auxiliary recess having a substantially corresponding opposing groove in its wall, the said locking means lying in said grooves, substantially as described.

2. In combination a reamer body for earth boring drills having a main recess in its side, and an auxiliary recess of less depth than the main recess and non-circular in cross section, a bearing block non-circular in cross section in said auxiliary recess and conforming substantially to the cross sectional shape of said auxiliary recess, means for locking the bearing block in place against lateral outward movement from said auxiliary recess, a reamer shaft mounted in the bearing block, and a reamer cutter mounted on said shaft and lying in the main recess, the bearing block having a groove extending substantially vertically in its side, and the auxiliary recess having a substantially corresponding opposing groove in its wall, said locking member being of wedge form and lying in said grooves.

3. In combination with a reamer body having a cutter recess and an auxiliary recess adjacent opposite ends of the cutter recess and communicating therewith, a reamer cutter bearing shaft having a bearing block at each end, a cutter on said shaft and lying in the cutter recess, said blocks each being located in one of the auxiliary recesses and seating on the bottom of the auxiliary recess to transmit radial thrusts to the reamer body, said blocks each having a groove substantially parallel with the cutter axis and registering with a groove in the reamer body, and a wedge in the grooves.

4. In combination with a reamer body having a cutter recess and auxiliary recesses adjacent the upper and lower ends of the same and in communication therewith, lugs projecting from the reamer body defining said auxiliary recesses, bearing blocks in the auxiliary recesses, registering grooves in the said blocks and lugs, a roller cutter shaft in the said blocks, a roller cutter on the shaft and lying in said cutter recess and a wedge positioned parallel with the cutter axis and engaging in the grooves.

5. A reamer body having means at each end for connection with the sections of a drill stem, a roller cutter recess in the side of the body, an auxiliary recess in said body at an end of the cutter recess, said auxiliary recess being rectangular in cross section, opening outwardly of the body and having a groove in a wall defining one side of the auxiliary recess and extending lengthwise thereof.

6. In a reamer body according to claim 5, a slot in said body positioned at the end of the auxiliary recess.

7. As an article of manufacture for deep well apparatus, a bearing block having an external seating surface thereon, a portion projecting at an angle from the bearing surface on the block, and grooves in the sides of said block extending in the general direction of the axis of the block.

8. As an article of manufacture for deep well apparatus, a bearing block having an external seating surface thereon, an end thrust receiving surface on said block comprising a flange projecting from said block, a socket in said block, and keyways positioned longitudinally of the block.

9. In a deep well reamer cutter assembly, a reamer body having a cutter recess therein and an auxiliary recess adjacent one end of and in communication with the cutter recess, a bearing block positioned in said auxiliary recess and having a face seating on the bottom of the auxiliary recess to transmit inward radial thrusts to the reamer body, said block having an integral flange portion projecting beyond said seating face of the block and extending into the main recess on the reamer body to transmit end thrusts to the reamer body, said block being positioned out of contact with a side wall of the recess, and locking means of tapered shape between the said block and said side wall of the recess, said taper serving to force the block away from said side wall and firmly against the opposite side wall of the recess.

10. A reamer cutter unit according to claim 3 in which said blocks and auxiliary recesses have grooves in their opposite faces, said wedge is a U shaped member having its legs positioned in the grooves.

11. In combination a reamer body for earth boring drills having a cutter receiving recess in its side, and a communicating auxiliary recess adjacent the cutter recess of less depth than the main recess and non-circular in cross section, a bearing block non-circular in cross section in said auxiliary recess and conforming substantially to the cross sectional shape of said auxiliary recess, means for locking the bearing block in place against longitudinal outward movement from said auxiliary recess comprising an integral flange projecting from the bearing block and extending into the cutter recess and against the end wall thereof adjacent the auxiliary recess, a reamer shaft mounted in the bearing block and a reamer mounted on the shaft and lying in the cutter recess, substantially as described.

12. In combination in a reamer unit for deep wells, a bearing shaft having a roller cutter thereon, and at each end of the shaft a bearing block, said bearing block having a keyway extending substantially parallel with the axis of the unit, and a lip on the block projecting at right angles to the axis of the unit.

13. In deep well drilling apparatus, a shaft for a roller cutter, said shaft having at each end a bearing block, said block having a seating face thereon and a portion projecting from the block at substantially right angles to the seating face, said block having a groove in another of its faces extending substantially parallel with the axis of the shaft.

14. In deep well drilling apparatus, a supporting body having a cutter recess and adjacent projecting lugs defining a recess therebetween, a shaft for a roller cutter, said shaft being supported in a bearing block seated on said supporting body and between said projecting lugs, and a key positioned in a keyway extending substantially parallel with the axis of said supporting body, said key being located between the lugs and the block, said block having a head portion positioned within the main cutter recess and overlapping an end wall of the cutter recess.

15. In a deep well drilling apparatus, a bearing block having a bearing recess therein to receive a cutter shaft and keyways in outer opposite faces thereof extending parallel with the axis of said bearing recess.

16. In deep well drilling apparatus, a supporting body having a cutter receiving recess therein and a separately formed auxiliary recess in communication therewith, and means for attaching a cutter to the supporting body comprising a member fitting in said auxiliary recess, and a locking key for retaining said member in the auxiliary recess, said member and wall of the auxiliary recess having registering grooves to receive therein said locking key.

17. Apparatus according to claim 16 in which a shoulder is located on the supporting body between the recesses, and said member has an angularly projecting integral portion abutting said shoulder.

18. In deep well drilling apparatus, a supporting body having a laterally opening recess in its side face, a member fitting in said laterally opening recess for holding a rotary cutter in operating relation to said supporting body, said member having grooves in opposite faces thereof and the walls of said recess having grooves therein complementary to said grooves in said member, and a key located in said grooves for holding said member in place, the said grooves being substantially parallel with the vertical axis of the supporting body.

19. Apparatus according to claim 18 in which said supporting body has a groove therein adjacent an end of said recess, and said key has a safety element projecting therefrom into said groove to limit outward movement of the key.

CLARENCE E. REED.